United States Patent Office 3,716,543
Patented Feb. 13, 1973

3,716,543
C₁₀–C₁₃ HYDROCARBYL SUBSTITUTED PYRIDINE COMPOUNDS
John B. Hall, Rumson, N.J., assignor to International Flavors and Fragrances Inc., New York, N.Y.
No Drawing. Continuation-in-part of application Ser. No. 854,787, Sept. 2, 1969. This application July 28, 1970, Ser. No. 59,027
Int. Cl. C07d 31/20
U.S. Cl. 260—290 V                 9 Claims

ABSTRACT OF THE DISCLOSURE

Novel nitrogen heterocyclic compounds defined by the structure:

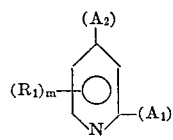

wherein $R_1$ represents $C_1$–$C_3$ lower alkyl and $m$ is an integer ranging from zero up to 2; wherein one of $A_1$ or $A_2$ is a moiety selected from the group consisting of cyclododecen - 3 - yl-methyl, 2-pinen-10-yl-methyl, 4,8-dimethyl - 3,7 - nonadienyl, 3-methyl - 6 - i-propyl-2-cyclohexenyl-methyl, and 1,4,8-trimethyl - 3,7 - nonadien-1-yl; and the other of $A_1$ or $A_2$ is $R_1$ or hydrogen.

CROSS-REFERENCE TO RELATED APPLICATIONS

This application is a continuation-in-part of U.S. application for Letters Patent No. 854,787 filed Sept. 2, 1969, and issued on June 16, 1972, as U.S. Pat. No. 3,669,908.

BACKGROUND OF THE INVENTION

There is a continuing search for materials having desirable fragrance and organoleptic properties. Such materials are sought either to replace costly natural materials or to provide new food flavors, tobacco flavors, fragrances, perfume types or flavor nuances which have not heretofore been available.

Especially desirable qualities for substances having interesting fragrances and flavors are stability in a wide variety of perfumed articles, perfume compositions and foodstuffs, ease of manufacture, intensity and pleasantness of aroma, and intensity and pleasantness of flavor.

THE INVENTION

The invention comprises the novel products, as well as novel processes according to which such products are manufactured, the specific embodiments of which are described hereinafter by way of example and in accordance with which it is now preferred to practice the invention.

Briefly, the present invention provides novel alkadienyl-, cycloalkenyl, cycloalkylidenealkyl, cycloalkylalkenyl and cycloalkenylalkyl substituted heterocyclic nitrogen compounds, particularly pyridines and pyrazines having the general formulae:

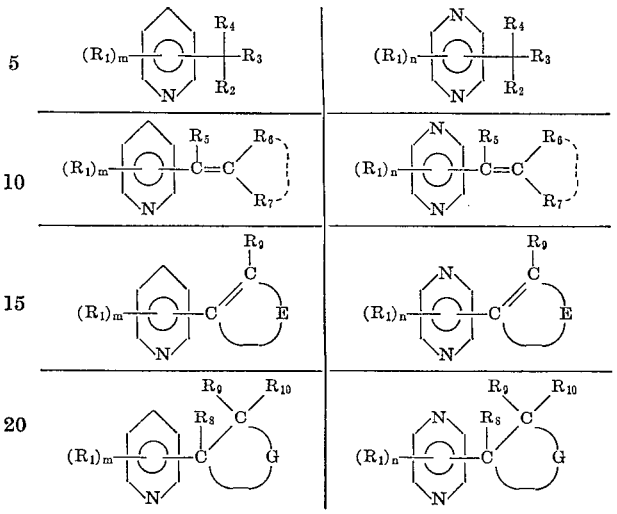

wherein $m$ is 1, 2, 3 or 4; and wherein $n$ is 1, 2 or 3; wherein the $R_1$ group (or groups) is (are) substituent(s) on one or more of the carbon atoms which are part of the heterocyclic rings; wherein $R_1$ is either hydrogen or alkyl including but not limited to, methyl, ethyl, propyl, butyl, pentyl and heptyl; wherein each of $R_2$ and $R_4$ are separately hydrogen, methyl or ethyl; wherein the sum of the number of carbon atoms in $R_2$ and $R_4$ (taken together) is from 0 up to 2; wherein the sum of the number of carbon atoms in $R_2$, $R_3$ and $R_4$ (taken together) is from 10 up to 13; wherein $R_3$ is C–9 C–10, C–11 or C–12 alkadienyl-, cycloalkenyl-, cycloalkylalkenyl-, cycloalkylidenealkyl- and cycloalkenylakyl; wherein $R_5$ is hydrogen, methyl or ethyl; wherein one of $R_6$ and $R_7$ is alkenyl and the other of $R_6$ and $R_7$ is hydrogen or lower alkyl, or $R_6$ and $R_7$ taken together form a cycloalkyl group; wherein the sum of the number of carbon atoms in $R_5$, $R_6$ and $R_7$ is from eight up to eleven; wherein $R_9$ and $R_{10}$ each represents hydrogen or lower alkyl, including but not limited to methyl, ethyl, n-propyl, i-propyl, n-butyl and n-pentyl; wherein E and G each represents a chain of alkyl substituted or unsubstituted carbon atoms completing a cycloalkenyl ring, including but not limited to monocyclic and bicyclic moieties; wherein the sum of the number of carbon atoms in $R_9$ and E (including alkyl substituents on the cycloalkenyl ring, if any) is from 8 up to 11, and the sum of the number of carbon atoms is $R_8$, $R_9$, $R_{10}$ and G (including alkyl substituents on the cycloalkenyl ring, if any) is from 8 up to 11.

Perfume, flavor and tobacco, flavor and fragrance modifying materials containing such substituent pyridines and pyrazines are also contemplated herein.

The present invention further relates to compositions useful in altering the organoleptic characteristics of a foodstuff or tobacco. More particularly, this invention has to do with, interalia, the use of the novel alkadienyl, cycloalkenyl, cycloalkylalkenyl, cycloalkylidenealkyl, and cycloalkenylalkyl-substituted heterocyclic ntirogen compounds of the invention to alter the flavor of foodstuffs and tobacco.

The term "alter" in its various forms is used herein to mean the supplying or imparting a flavor character or note to an otherwise bland, relatively tasteless substance, or augmenting the existing flavor characteristic where a natural flavor is deficient in some regard, or supplementing the existing flavor impression to modify its quality, character or taste.

The term "foodstuff" as used herein includes both solid and liquid ingestible materials which usually do, but need not, have nutritional value. Thus, foodstuffs include meats, gravies, soups, convenience foods, beverages, dairy products candies, vegetables, cereals, soft drinks, snacks and the like.

Seafood-like, potato and spice such as cinnamon flavored foodstuffs are very popular, and a great deal of effort has been devoted to the preparation of materials which have a seafood-like, potato or natural spice flavor as well as to improve the spicy, fish-like or potato flavors of certain types of natural materials.

As used herein, "seafood-like" flavors will be understood to mean flavors associated with marine animals including crustaceans such as shrimp, lobster and the like; mollusks such as oysters, clams, and the like; and particularly fish including smoked fish, dried fish, salted fish, and the like. Thus, at levels as low as 50 parts per billion, several of the nitrogen heterocyclic compounds of the invention begin to impart a very light, almost indefinable, sensation in aqueuos solution. As the level is increased to one part per million (p.p.m.) a definite pleasant salt water fish-like character is imparted to an aqueous solution. As the level reaches 2 p.p.m., a definite, good characteristic fish-like flavor is obtained and this flavor persists up through levels of 10 p.p.m. and beyond, where the substance leaves a light, lingering aftertaste.

In the past, it was found that substitute spice (such as cinnamon) flavoring materials lacked certain supporting qualities [e.g. woodiness or bark-like] characteristics found in quality spice (such as cinnamon and pimentos). It was further found that substitute potato flavoring materials lacked certain "green" characteristics found in the flavor of natural potato and the products made from such materials were deficient in flavor and/or aroma. It was further found that many tobacco products, particularly after processing thereof lacked adequate flavor. In addition, it was found that many proteinaceous products such as fish protein products prepared according to the processes set forth in French Pat. 1,540,106, U.S. Pat. 3,437,489 or British Pat. 1,157,-415 are devoid of the flavors required to make them palatable, e.g. give them a high quality "seafood-like" flavor.

In accordance with this invention, it has been found that novel tobacco, foodstuff and flavoring compositions having "seafood-like," "spice" (such as cinnamon) or "tobacco-like" characteristics found in quality fish, spice and tobacco flavors may be provided by the utilization of at least one of the novel compounds of this invention. It has also been found that novel potato flavoring compositions having "green" characteristics found in natural potato may be provided by the utilization of at least one of the compounds of the invention.

The novel heterocyclic compounds are obtained by one of several processes involving:

(1) The reaction of a picoline or higher homologue ($\alpha$, $\beta$, or $\gamma$ methyl, ethyl or propyl pyridine) or a methyl, ethyl, or propyl pyrazine with C–9, C–10, C–11 or C–12 conjugated cycloalkenylalkanes, conjugated cycloalkadienes or alkatrienes (having two of its double bonds conjugated) or C–9, C–10, C–11 or C–12 alkadienyl, cycloalkylalkenyl, cycloalkenyl, or cycloalkylidenealkyl, or cycloalkenylalkyl halides, tosylates, mesylates or similar sulfonic acid esters;

(2) The reaction of an alkyl-substituted or unsubstituted pyrazine or pyridine with an aldehyde or ketone which also may contain a carbon-carbon double bond, in the presence of mercuric chloride and aluminum or magnesium, followed by hydrolysis, and dehydration and, if necessary, hydrogenation;

(3) The reaction of a pyridine or pyrazine grignard with an aldehyde or ketone which may contain a carbon-carbon double bond, followed by hydrolysis, dehydration and, if necessary, hydrogenation; and (4) The reaction of a lithium picoline or a lithium methyl pyrazine with an aldehyde or ketone which may contain a carbon-carbon double bond, followed by hydrolysis, dehydration, and, if necessary, hydrogenation; as more fully described hereinafter.

More specifically, this invention contemplates C–10, C–11, C–12 or C–13 alkadienyl, cycloalkenyl, cycloalkylalkenyl, cycloalkylidenealkyl and cycloalkenylalkyl nitrogen heterocyclic compounds which can additionally contain one or more alkyl substituents on a ring carbon atom. Desirably, the alkyl substituent on the heterocyclic ring is a lower alkyl group and it preferably contains from one to about three carbon atoms. Thus, the invention encompasses, but is not limited to the following compounds:

2-(4,8-dodecadienyl)pyridine
4-(4,8-undecadienyl)pyrazine
2-(1,4,8-trimethyl-3,7-nonadienyl)pyridine
2-(1-methyl-4,8-dodecadienyl)pyridine
2-(4,8-dimethyl-3,7-nonadienyl)pyridine
3-(4,8-dimethyl-3,7-nonadienyl)pyridine
4-(4,8-dimethyl-3,7-nonadienyl)pyridine
2-(4,8-dimethyl-3,7-nonadienyl)pyrazine
3-ethyl-6-(4,8-dimethyl-3,7-nonadienyl)pyridine
2-ethyl-4-(4,8-dimethyl-3,7-nonadienyl)pyridine
3-ethyl-4-(4,8-dimethyl-3,7-nonadienyl)pyridine
2-(cyclododecen-3-yl)pyridine
4-(2-pinen-10-yl-methyl)pyridine
2-(2-pinen-10-yl-methyl)pyridine
4-(2-pinen-10-yl-methyl)-2-n-propyl pyridine
2-ethyl-5-(4,8-dimethyl-3,7-nonadienyl)pyrazine
(2-cyclododecen-1-yl)pyrazine
4-(2-cyclododecen-1-yl-methyl)pyridine
5-(4,8-dimethyl-3,7-nonadienyl)-2-n-propyl pyrazine The compounds of this invention may occur in various isomeric forms such as "cis-cis," "trans-trans," "cis-trans" and "trans-cis" and such isomeric forms are contemplated within the scope of the invention and included in the formulae shown.

It has been found that, unlike known nitrogen heterocyclic compounds such as $\alpha$-(3-phenyl propyl)pyridine [described by Arctander, "Perfume and Flavor Chemicals, vol. II, No. 2601] those compound described in U.S. Pat. 2,427,286; those described in Chumekov et al. (Chem. Abstracts 63:5594y) Ukr. Khim. Zh:31 (5) 506–13 (1965); and those described in Pines et al., J. Org. Chem. 32, 3183, 1967, the compounds of this invention themselves possess qualities (depending upon their particular structure, e.g. position and/or size of ring-substituent(s)) associated with (1) aromas including "seashore" or "fish-like" aromas or "green pepper," "potato," valuable citrus undertones such as "petitgrain oil-like," "corianderoil-like"; or "berry fruit," "green" or "woody-amber" aromas; or (2) flavor notes including those useful in imparting seafood-like qualities to foodstuffs, those useful in potato such as "green" notes as well as those useful in spice flavors including "woody" notes. These flavor and fragrance qualities particularly adapt the novel nitrogen heterocyclic compounds of this invention for incorporation into perfume and fragrance-modifying compositions having desirable "seashore," "green-peppery," "berry fruit," or "woody-amber" or "green" aromas or flavor-modifying compositions requiring "green" or "seafood-like" or "spice-like" notes. Even small percentages of the compounds of this invention will alter, improve, modify or vary the organoleptic or odor impression of a flavor or perfume so as to impart either such notes as "seashore" or "woody-amber" notes (to the perfume composition), or such notes as "green" or "seafood-like" or "spice-like" notes to the flavor composition.

It will be appreciated by those skilled in the art from the present disclosure, that the fragrance character of the finished perfume compositions can be tailored to specific uses, as more fully described hereinafter; and that the flavor character of the finished flavor compositions can be tailored to specific uses in foodstuffs, beverages or tobacco as more fully described hereinafter.

A number of different starting materials can be utilized to produce the novel nitrogen heterocyclic compounds of this invention.

In one method of this invention a methyl pyridine (picoline) or methylpyrazine is reacted with a C–10 alkadienyl or cycloalkenyl or cycloalkylalkenyl or cycloalkylidenealkyl, or cycloalkenylalkyl halide, tosylate or mesylate or similar C–10 sulfonic acid ester in the presence of an alkali metal or alkali metal amide or hydride to form the corresponding C–11 alkadienyl or cycloalkenyl or cycloalkylalkenyl or cycloalkylidenealkyl or cycloalkenylalkyl pyridine or pyrazine. Similarly, ethyl-, n-propyl, or i-propyl-pyridines or pyrazines are reacted with C–10 alkadienyl halides, tosylates or mesylates or similar C–10 alkadienyl sulfonic acid esters in the presence of an alkali metal or alkali metal amide or hydride to form the corresponding C–12 or C–13 alkadienyl pyridine or pyrazine. In addition, methyl, ethyl or propyl pyridines or methyl, ethyl or propyl pyrazines may be reacted with C–9, C–10, C–11 or C–12 alkadienyl or cycloalkenyl or cycloalkenylalkyl or cycloalkylalkenyl or cycloalkylidenealkyl halides, tosylates, mesylates or similar alkyl sulfonic acid esters. The procedure is simiar to that set forth in Brown and Murphey, J. Am. Chem. Soc., 73, 3308 (1951).

Examples of C–9, C–10, C–11 and C–12 alkadienyl-, or cycloalkenyl or cycloalkenylalkyl or cycloalkylalkenyl or cycloalkylidenealkyl halides, tosylates and mesylates useful as reactants and contemplated within the scope of this invention are myrtenyl chloride; 2,6-undecadienyl chloride; myrcene hydrochloride; 3-chlorocyclododecene; 2,6-nonadienylchloride; cyclohexylidene-n-butyl bromide; myrcene hydrobromide; geranyl chloride; geranyl bromide; neryl chloride, neryl bromide, geranyl tosylate, and geranyl mesylate. The structures of several of the aforementioned halides are set forth in U.S. Pat. 2,822,323.

In another method of this invention a methyl, ethyl, or propyl pyridine is reacted with a C–9, C–10, C–11 or C–12 alkatriene having two of its double bonds conjugated or a conjugated cycloalkadiene or a conjugated cycloalkenylalkene in the presence of an alkali metal such as sodium, potassium or lithium metal to form the alkadienyl, cycloalkenyl or cycloalkenylalkyl pyridines and pyrazines of this invention. Suitable alkatrienes include myrcene [3-methylene-7-methyl-1,6-octadiene]; 1,4,6-undecatriene; 2,3,7-trimethyl-2,5,7-nonatriene; and 2,5,7-trimethyl-2,5,7-octatriene. Suitable cycloalkadienes and cycloalkenyl alkenes include 1-vinyl-1-cyclodecene; 1,3-cycloundecadiene; 3-methylene-cyclodecene-1; 3-methylene cyclododecene-1; 2,4,6-trimethyl-cyclohexa - 1,3 - diene; verbenene having the structure:

Δ³,⁸-p-menthadiene; α-phellandrene; nopadiene; 1,3-cyclododecadiene and β-phellandrene having the structure:

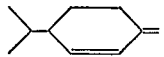

The procedure is similar to that used by Chumakov et al. in Ukr. Khim. Zh. 31 (5), 506–13 (1965).

As used herein structures such as those set forth in the preceding paragraph [wherein methyl (CH₃) groups and methylene (CH₂) groups are included as part of the structure] show these methyl and methylene groups simply as straight lines, thus:

is intended to mean:

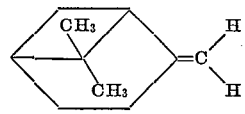

Examples of alkyl pyridines and alkyl pyrazines useful as reactants and which are contemplated within the scope of the processes of this invention are 2-methylpyridine;
2-ethylpyridine;
2-n-propyl pyridine;
2-methyl-5-ethyl pyridine;
2,5-diethyl pyridine;
2-methyl-5,6-diethylpyridine;
4-methyl-5-ethylpyridine;
4-methyl-5-propyl-pyridine;
2-methylpyrazine;
2-methyl-5-ethylpyrazine;
2-methyl-3-ethylpyrazine;
2-methyl-5,6-diethylpyrazine;
2-methyl-5-(i-propyl)pyrazine;
2,5-di-n-propyl pyridine;
and 2-ethyl-5-i-propyl pyridine.

The following table exemplifies specific reactants and products obtained by using the aforementioned reactants:

TABLE I

| Nitrogen heterocyclic compound | Alkadienyl halide mesylate or tosylate; alkatriene: cycloalkadiene: or cycloalkenylalkene | Reaction product |
|---|---|---|
| 2-methyl-pyridine | Cyclododecen-3-yl-chloride. | 2-(cyclododecen-3-yl-methyl)pyridine. |
| 4-methyl-pyridine | Myrtenyl chloride | 4-(2-pinen-10-yl-methyl) pyridine. |
| 2-methyl-pyridine | do | 2-(2-pinen-10-yl-methyl) pyridine. |
| 2-n-propyl-4-methyl pyridine. | Myrtenyl bromide | 2-n-propyl-4-(2-pinen-10-yl-methyl) pyridine. |
| 2,5-diethyl pyrazine | 1-chloro-3,7-dimethyl 2,6-octadiene. | 2-ethyl-5-(4,8-dimethyl-3,7-nonadienyl)pyrazine. |
| Methyl pyrazine | 3-methylene-1-cyclodecene. | (2-cyclodecen-1-yl-methyl) pyrazine. |
| 4-methyl-pyridine | 1-chloro-3,7-dimethy 2,6-octadiene. | 4-(4,8-dimethyl-3,7-nonadienyl)pyridine. |
| 2-methyl-pyridine | 4,8-dimethyl-1,3,7-octatriene. | 2-(4,8-dimethyl-3,7-nonadienyl)pyridine. |
| 5-ethyl-2-methyl-pyridine. | 1-chloro-3,7-dimethyl-2,6-octadiene. | 2-ethyl-5-(4,8-dimethyl-3,7-nonadienyl)pyridine. |
| 2-methyl-pyridine | β-Phellandrene | 2-(3-methyl-6-i-propyl-2-cyclohexenylmethyl) pyridine. |
| Do | Verbenene | 2-(2-pinen-10-yl-methyl) pyridine. |

The reactants are carried out preferably at atmospheric pressure at temperatures of the order of 0° C. up to 100° C. It is preferred to use an excess of the alkyl pyridine or alkyl pyrazine compound; of the order of 10–150%. The reactions are carried out in the presence of an alkali metal or alkali metal amide of hydride, such as sodium metal, potassium metal, lithium metal, sodium amide, sodium hydride, potassium amide or lithium amide.

At the completion of any of the foregoing reactions the reaction mixture is preferably poured into water and then purified. The novel compounds are recovered from the reaction mixture by means of suitable techniques such as distillation, extraction, chromotographic techniques and the like. It has been found that fractional distillation under vacuum is a desirable way to obtain the pure compounds from the reaction mixtures.

The instant reactions are summarized generally as follows:

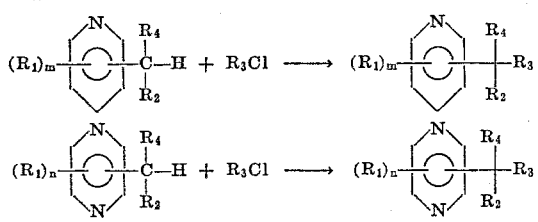

wherein $R_1$ is hydrogen or lower alkyl, $R_2$ and $R_4$ are hydrogen methyl or ethyl, $R_3$ is C-9, C-10, C-11 or C-12 alkadienyl-, cycloalkenyl-, cycloalkylalkenyl-, cycloalkylidenealkyl- and cycloalkenylalkyl (substituted or unsubstituted); $m$ is 1, 2, 3 or 4; $n$ is 1, 2 or 3; the sum of the number of carbon atoms contained in the groups $R_2$ and $R_4$ being from 0 to 2.

A specific example of the instant reaction is as follows:

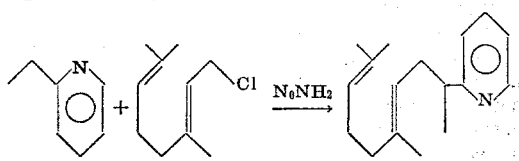

An additional synthesis technique for production of the C-10, C-11, C-12 and C-13 alkadienyl-, cycloalkylalkenyl, cycloalkenyl and cycloalkylidenealkyl and cycloalkenylalkyl pyridines and pyrazines of this invention involves the reaction of a pyridine or pyrazine grignard with a C-10, C-11, C-12 or C-13 alkenal, alkenone, cycloalkylalkanone, cycloalkenyl-alkanal, alkenyl-cycloalkanone, alkylidene-cycloalkanone, epoxy cycloalkane or cycloalkenone; followed by hydrolysis and subsequent dehydration; and if the case required it, subsequent hydrogenation. Cycloalkanones are also suitable reactants. Epoxycycloalkenes, alkadienals, cycloalkylalkenones, cycloalkenylalkanones, alkadienones and cycloalkadienalkanals and cycloalkadienones may also be used and an additional hydrogenation step is necessary in these cases in order to yield the desired novel products of this invention.

Suitable pyridine and pyrazine grignard materials are: α - pyridyl - magnesium chloride - tetrahydrofuran complex; γ - pyridyl - magnesium chloride - tetrahydrofuran complex; pyrazine - magnesium chloride-tetrahydrofuran complex; 5 - methylpyrazine - 2 - magnesium chloride-tetrahydrofuran complex; and 5-ethyl pyridine - 2 - magnesium chloride tetrahydrofuran complex, produced via the process described by Ramsden in U.S. Pat. 2,959,589 issued on Nov. 8, 1960.

An example of a suitable alkenal is citronellal [3,7-dimethyl-6-octen-1-al]. An example of a suitable cycloalkenylalkanal is phellandral having the structure:

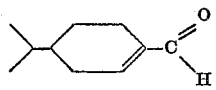

An example of a suitable cycloalkylalkanone is tetrahydroionone having the structure:

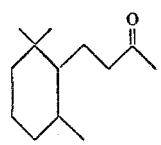

An example of a cycloalkenylalkanone is "Damascone" having the structure:

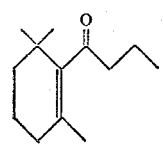

An example of a suitable alkenone is 5-decen-2-one having the structure:

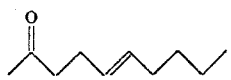

Examples of epoxy cycloalkanes suitable for utilization in reacting with pyridine or pyrazine grignards are: 3,4-epoxycarene having the structure:

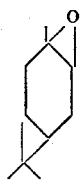

cyclododecane epoxide and cyclodecane epoxide.

Examples of cycloalkanones suitable for use in reacting with pyridine or pyrazine grignards are: menthone and carvomenthone having the structures, respectively:

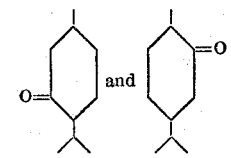

carone and caronone having the structures, respectively:

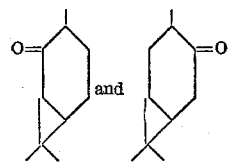

pinocamphone and verbanone having the structures, respectively:

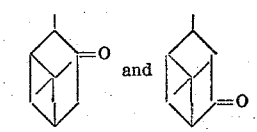

fenchone and camphor having the structures, respectively:

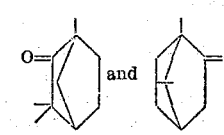

thujone having the structure:

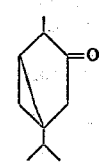

An example of a suitable alkenylcycloalkanone is isodihydrocarvone having the structure:

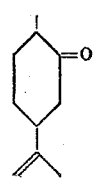

Examples of suitable alkylidene cycloalkanones are pulegone (dextro), [d-p-menth-4(8)-en-3-one], having the structure:

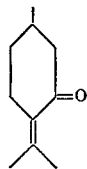

and pinocarvone having the structure:

Examples of suitable cycloalkenones are piperitone having the structure:

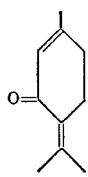

and verbenone having the structure:

and umbellulone having the structure:

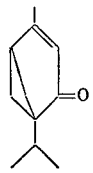

An example of a suitable epoxy cycloalkene is 7,8-epoxy-1-cyclododecene having the structure:

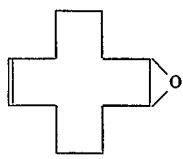

Suitable hydrolysis reagents are mineral acids such as dilute hydrochloric acid and dilute sulfuric acid. Dehydration may be accomplished by heating the hydrolyzed materials in the presence of such mineral acids.

The instant reaction sequence is summarized generally as follows:

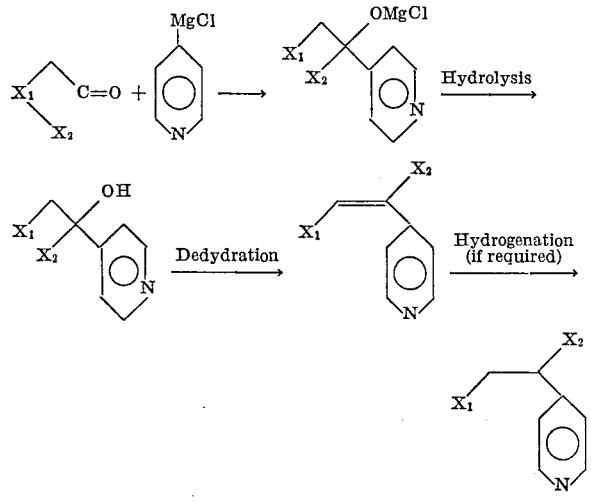

wherein $X_1$ and $X_2$ can form a cycloalkylene ring or one of $X_1$ or $X_2$ represents alkenyl or cycloalkenyl and the other $X_1$ or $X_2$ represents alkyl or hydrogen. A specific example of the instant reaction is as follows:

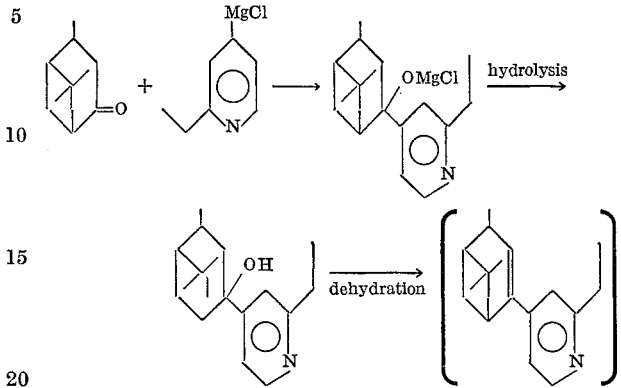

The C–10, C–11, C–12 or C–13 alkadienyl-, cycloalkenyl, cycloalkylidenealkyl, cycloalkylalkenyl and cycloalkenylalkyl pyridines and pyrazines of this invention, produced as indicated above, may be used as such, or may be further treated in order to isomerize the compounds as by (1) shifting the carbon-carbon double bond (or bonds, as the case may be) located in the hydrocarbon moiety which is bonded to the heterocyclic nitrogen moiety; or by (2) "cracking" the hydrocarbon ring moiety [in the case of such compounds as 2-(2-pinen-10-yl-methyl)pyridine].

The shifting of the carbon-carbon double bond (or bonds) may be accomplished by use of either (a) catalytic quantities of palladium or iron carbonyl; (b) Lewis acids such as excess $BF_3$ or $BH_3$ in anhydrous media [as taught by Brown et al., J. Am. Chem. Soc., vol. 89, pg. 567 (Feb. 1, 1967)] and (c) potassium-t-butoxide in dimethyl sulfoxide.

The "cracking" reaction is accomplished by subjecting such materials as 2-(2-pinen-10-yl-methyl)pyridine to temperatures in the range of 250–500° C.

Thus, for example the following "cracking" reaction takes place:

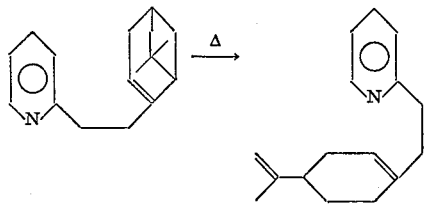

Subsequent hydrogenation of this product yields:

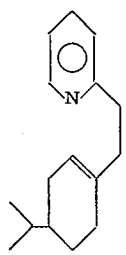

thereby producing another, useful product of this invention.

The C–10, C–11, C–12 and C–13 alkadienyl-, cycloalkenyl, cycloalkylalkenyl, cycloalkylidenealkyl and cycloalkenylalkyl pyridines and pyrazines produced according to this invention are olfactory and/or organoleptic agents and can be incorporated into a wide variety of compositions which, when added thereto in small quantities of about one or two percent will be enhanced by their property of imparting additional "seashore," "fishlike," "green-pepper," "woody-amber," "green" or "berry-fruit" notes to the fragrance or imparting additional "seafood-like," "spice," or "green" notes to the flavor. The materials bring to perfumery a new dimension in seashore notes or green, woody-amber, or berry fruit notes different from those of existing materials now in use and to foodstuff flavorings a new dimension in "green," "spice," and "seafood-like" notes different from those notes in existing materials now in use.

An additional synthesis technique for the production of C-10, C-11, C-12 and C-13 alkadienyl, cycloalkenyl, cycloalkyl alkenyl, cycloalkylidenealkyl and cycloalkenylalkyl pyridines and pyrazines of this invention involves the reaction of a C-10, C-11, C-12 or C-13 cyclic ketone; or a C-10, C-11, C-12 or C-13 alkenone of the formula:

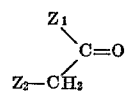

wherein $Z_1$ is methyl or ethyl and $Z_2$ represents an alkenyl moiety; or a C-10, C-11, C-12 or C-13 cycloalkyl alkenone of the formula:

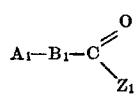

wherein $A_1$ represents cycloalkyl and $B_1$ represents an alkenylenyl and $Z_1$ is methyl or ethyl, the sum of the number of carbon atoms in $A_1$, $B_1$ and $Z_1$ being from nine up to twelve; or a C-10, C-11, C-12 or C-13 cycloalkenylalkanone of the formula:

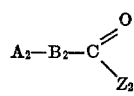

wherein $A_2$ represents cycloalkenyl, $B_2$ represents alkyl and $Z_2$ represents methyl or ethyl with pyridine or pyrazine in the presence of aluminum or magnesium metal turnings and mercuric chloride in order to form an alcohol. Dehydration of the alcohol yields the C-10, C-11, C-12 or C-13 alkadienyl, cycloalkenyl, cycloalkenylalkyl, cycloalkylidenealkyl and cycloalkylalkenyl pyridine or pyrazines of the instant invention. In the alternative, pyridine or pyrazine may be reacted as above with C-10, C-11, C-12 or C-13 alkadienones of the formula:

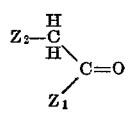

wherein $Z_1$ is methyl or ethyl and $Z_2$ is an alkadienyl moiety containing from seven to ten carbon atoms and not containing allenic unsaturation; cycloalkenylalkanones or cycloalkylalkenones of the formula:

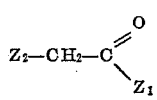

wherein $Z_1$ is methyl or ethyl and $Z_2$ is cycloalkylalkenyl, cycloalkenylalkyl or cycloalkylidenealkyl containing from seven up to ten carbon atoms. In this latter situation hydrogenation is necessary subsequent to the dehydration step in order to yield the desired products for the instant invention. Lower adjacent methyl homologues of the foregoing ketones may also be reacted with *methyl* pyridines or *methyl* pyrazines, the heterocyclic rings of which may also contain additional alkyl substituents.

Generally, the immediately preceding reaction is illustrated thus:

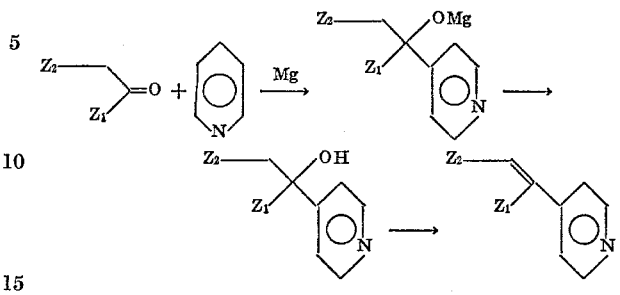

A specific example of the reaction is as follows:

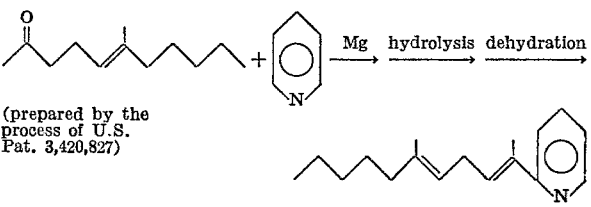

(prepared by the process of U.S. Pat. 3,420,827)

The foregoing reaction is described for producing compounds other than the compounds of this invention by Lochte et al., (J. Am. Chem. Soc., 75; 4477-4481) (1953).

Still a further synthesis technique for the production of C-10, C-11, C-12 or C-13 alkadienyl-, cycloalkenyl, cycloalkylalkenyl, cycloalkenylalkyl and cycloalkylidenealkyl pyridines and pyrazines of this invention involves the reaction of lithium picolines or lithium methyl pyrazines with C-9, C-10, C-11 and C-12 alkenals, alkenones, cycloalkanones, cycloalkylalkanones and cycloalkylalkanals, followed by hydrolysis of the resultant lithium salt, dehydration and, if the case requires it hydrogenation. Suitable lithium picoline compounds include:

α-picoline lithium;
β-picoline lithium;
γ-picoline lithium;
4-methyl-2-lithium-methyl pyridine;
4-ethyl-2-lithium methyl pyridine;
2-lithium-methyl pyrazine;

Suitable carbonyl-containing compounds include:

Citronellal,
Phellandral,
Tetrahydroionone,
5-decen-2-one,
Isodihydrocarvone,
Pinocarvone,
Piperitone,
Verbenone,
Umbellulone, and
Cyclodec-5-ene-1-one (as prepared by the process of French Pat. 1,536,621).

If the case requires it, subsequent to the dehydration step a hydrogenation step is necessary in order to yield the desired novel products of this invention. Suitable hydrolysis reagents are mineral acids such as dilute hydrochloric acid or dilute sulfuric acid. Dehydration may be accomplished by heating the hydrolyzed materials in the presence of the said mineral acids or in the presence of oxalic acid. The nature of the foregoing reaction sequence is discussed by Arens et al. Rec. Trav. Chim. 69, 287–294 (1950). Hydrogenation may be carried out using hydrogen over a palladium or nickel catalyst.

The instant reaction sequence is summarized as follows:

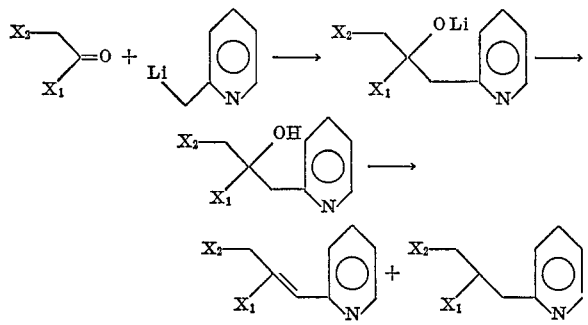

wherein $X_1$ and $X_2$ taken together can form a cycloalkene ring or cycloalkane ring, or one of the $X_1$ or $X_2$ groups represents alkenyl, alkadienyl, cycloalkenyl, cycloalkyl, cyclolakylalkyl or cycloalkenylalkyl and the other of the $X_1$ or $X_2$ groups represents alkyl or hydrogen. A specific example of the instant reaction is as follows:

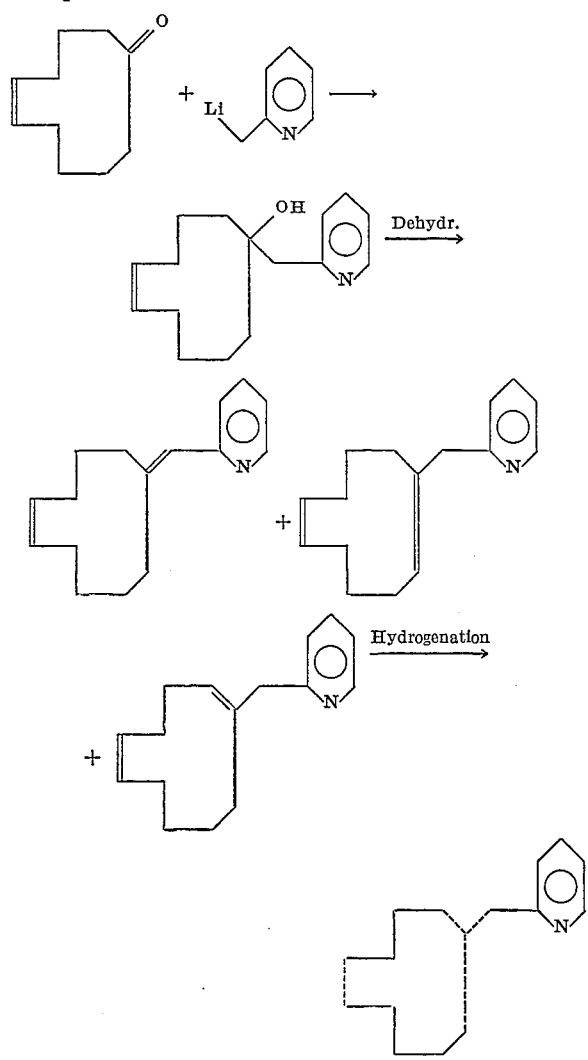

wherein one of the dashed lines is a carbon-carbon double bond, and each of the other dashed lines represents a carbon-carbon single bond.

The aforementioned reactions involving the reactions of ketones and aldehydes with heterocyclic nitrogen compounds including the aforementioned pyridines, pyrazines, pyridine grignards, pyrazine grignards, picoline-lithium compounds and pyrazine methyl lithium compounds are carried out in anhydrous solvents such as tetrahydrofuran, diethyl ether, xylene and benzene.

The preferred reaction conditions for reactions of the aforementioned aldehydes and ketones with the aforementioned pyridines, pyrazines, pyridine grignards pyrazine grignards, picoline-lithium compounds and pyrazine methyl lithium compounds are tabulated as follows:

| Heterocyclic nitrogen compound | Mole ratio of heterocyclic nitrogen compound: carbonyl compound | Concentration of reactants in solvent (M) | Temperature of reaction (° C.) | Mole ratio of catalyst to reactant |
|---|---|---|---|---|
| Pyridine and pyrazine [1] | 2:1-1:2 | 0.5-3.0 | 200-250 | 1:10 |
| Pyridine and pyrazine grignard | 2:1-1:4 | 0.1-4 | 10-40 | |
| Picoline-lithium and pyrazine methyl lithium | 5:1-1:1 | 0.5-3.0 | -15-0 | |

[1] Using the Lochte et al. procedure.
[2] Using the Arens et al. procedure.

Reactions of the heterocyclic nitrogen grignard compounds with the above mentioned epoxy compounds take place at temperatures in the range of 60-80° C.

The heterocyclic nitrogen compounds of this invention can be added to flavor and/or perfume compositions in their pure form or they can be added to mixtures of materials in flavor and/or fragrance imparting compositions to provide a desired organoleptic or fragrance character to be finished flavor or perfum material (as the case may be). The flavor, perfume and fragrance compositions obtained according to this invention are suitable in a wide variety of foodstuffs and perfumed articles and can also be used to improve, enhance, modify, alter or reinforce natural flavor and fragrance materials. It will thus be appreciated that the heterocyclic nitrogen compounds and mixtures thereof of this invention are useful as olfactory agents and fragrances or organoleptic agents and flavors.

The term "perfume composition" is used herein to mean a mixture of compounds, including for example, natural oils, synthetic oils, alcohols, aldehydes, ketones, esters, lactones, and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round-off and accompany the main note; (c) fixatives which include odorous substances which lend a particular note to the perfume throughout all stages of evaporation, and substances which retard evaporation; and (d) top-notes which are usually low-boiling, fresh-smelling materials.

Such perfume compositions or the novel materials of this invention can be used in conjunction with carriers, vehicles, solvents, dispersants, emulsifiers, surface-active agents, aerosol propellants, and the like. In perfume compositions, the individual components contribute their particular olfactory characteristics, but the overall effect of the perfume composition will at least be the sum of the effect of each ingredient. Thus, the nitrogen heterocyclic compounds of this invention can be used to alter the aroma characteristics of a perfume composition, for example, by highlighting or moderating the olfactory reaction contributed by another ingredient of the composition.

The amount of one or more compounds of this invention which will be effective in perfume compositions depends on many factors, including the other ingredients, their amounts and the effects which are desired. It has been found that perfume compositions containing as little as 1.0% by weight of the compounds of this invention, or even less can be used to intensify or augment and enhance various types of fragrance compounds, the odors of which may be desired to be imparted to colognes, perfumes, bath oils and other cosmetic products. The amount employed will depend on considerations of cost, nature of the end product, the effect desired in the finished product, and the particular fragrance sought. Higher concentrations (e.g. 4% by weight) of the nitrogen heterocyclic compounds of this invention will intensify the "seashore," "fish-like," "green," "woody-amber," "green-pepper" or "berry fruit" notes of the compositions.

The nitrogen heterocyclic compounds disclosed herein can be used in a composition as an olfactory component of a fragrance which in turn can be used in perfumes, colognes, bath preparations (such as bath oils and bath salts) and the like. When the alkadienyl, cycloalkenyl, cycloalkylalkenyl, cycloalkylidenealkyl or cycloalkenylalkyl pyridines or pyrazines of this invention are used in finished perfumed articles, such as the foregoing, they can be used in amounts of 0.04% or lower.

When used to impart, alter, modify or enhance flavors in foodstuffs and in tobacco, the novel alkadienyl, cycloalkenyl, cycloalkylalkenyl, cycloalkylidenealkyl or cycloalkenylalkyl-substituted heterocyclic nitrogen compounds of this invention may be employed either singly or in admixture comprising two or more thereof. In this manner, the processer is afforded means whereby to exploit the beneficial nature of each of a plurality of compounds in a specific instance.

In many instances the optimum balance of flavor is obtained by utilizing mixtures of compounds wherein at least one component comprises an unsubstituted C-10, C-11, C-12 or C-13 alkadienyl, cycloalkenyl, cycloalkylalkenyl, cycloalkylidenealkyl, cycloalkenylalkyl, pyridine or pyrazine, i.e., contains no substituents on either the pyrazine moiety or the pyridine moiety and the other component comprises at least one *substituted* C-10, C-11, C-12 or C-13 alkadienyl, cycloalkenyl, cycloalkylalkenyl, cycloalkylidenealkyl or cycloalkenylalkyl pyridine or pyrazine (i.e. an alkyl-substituted pyridine or pyrazine moiety).

Such mixtures may comprise, for example, 5-ethyl-2-(4,8-dimethyl - nona - 3,7-dienyl) pyridine; 2-(4,8-dimethyl-nona-3,7-dienyl) pyrazine and/or 4(5,9-undecadienyl) pyridine. When mixtures of the C-10, C-11, C-12 and C-13 alkadienyl, cycloalkenyl, cycloalkylalkenyl, cycloalkylidenealkyl or cycloalkenylalkyl pyridines and pyrazines are used, their proportions can be varied as desired to suit the particular foodstuff to be flavored and will depend upon whether the composition so formulated is utilized to supply a total organoleptic impression or to enhance or fortify an existing flavor and/or aroma characteristic. It has been found when preparing spice or cinnamon flavors, for example, that a good blend is obtained by using a mixture of about 10–20% of at least one unsubstituted C-12 alkadienyl pyridine e.g. 2(2,4,8-trimethyl-3,7-nonadienyl) pyridine and/or 4(2,4,8-trimethyl-3,7-nonadienyl) pyridine; about 40–50% of at least one C-11 alkadienyl pyridine having alkyl substituents on the pyridine moiety, e.g., 2(4,7-dimethyl-3,7-nonadienyl)-4-propyl-pyridine; 3-ethyl-4-(4,8-dimethyl - 3,7 - nondienyl) pyridine; and/or 2-methyl-4-(4,8-undecadienyl) pyridine; about 10–20% of at least one alkyl substituted C-12 alkadienyl pyrazine, e.g., 2-methyl-4-(4,8-dodecadienyl) pyrazine and/or 4-ethyl-4-(2,4,8-trimethyl-4,8-nondienyl) pyrazine; and about 20–30% of at least one C-10 alkadienyl pyrazine, e.g., 3(3,7-decadienyl) pyrazine. It will be understood that these ratios can be varied to supply, enhance, modify or fortify the flavor of the foodstuff or flavoring composition.

The nature of the co-ingredients included with the alkadienyl, cycloalkenyl, cycloalkylalkenyl, cycloalkylidenealkyl or cycloalkenylalkyl heterocyclic nitrogen compound or compounds of this invention in formulating the product composition will, of course, depend primarily upon the ultimate use contemplated, i.e., as a foodstuff per se or tobacco flavor per se, or alternatively as a flavoring composition adapted to be added to a foodstuff or tobacco at some subsequent point of time. In any event, such compounds serve to alter the organoleptic characteristics of the ultimate foodstuffs or tobacco treated therewith.

Substances suitable for use herein as co-ingredients or flavoring adjuvants are well known in the art for such use being extensively described in the relevant literature. Apart from the requirement that any such material be "ingestibly" acceptable, and thus non-toxic or otherwise non-deleterious, nothing particularly critical resides in the selection thereof. Accordingly, such materials, which may in general be characterized as flavoring adjuvants or vehicles comprise broadly, stabilizers, thickeners, surface active agents, conditioners, flavorants and flavor intensifiers.

Stabilizer compounds included preservatives, e.g. sodium chloride, antioxidants, e.g., calcium and sodium ascorbate, ascorbic acid, butylated hydroxyanisole (mixture of 2 and 3 tertiary butyl-4-hydroxyanisoles), butylated hydroxy toluene (2,6-di-tertiary-butyl-4-methyl phenol), propyl gallate and the like, and sequestrants, e.g. citric acid.

Thickener compounds include carriers, binders, protective colloids, suspending agents, emulsifiers and the like, e.g., agar-agar; carrageenan; cellulose derivatives such as carboxymethyl cellulose and methyl cellulose; natural and synthetic gums such as gum arabic, gum tragacanth; gelatin, proteinaceous materials, lipids; carbohydrates; starches; pectins, and emulsifiers, e.g., mono- and diglycerides of fatty acids, skim milk powder, hexoses, pentoses, dissacharides e.g., sucrose, corn syrup solids and the like.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g. carminic acid, cochineal, tumeric and curcinin and the like; firming agents such as aluminum sodium sulfate, calcium chloride and calcium gluconate; texturizers; anti-caking agents, e.g., aluminum calcium phosphate; enzymes; yeast foods, e.g., calcium lactate and calcium sulfate; nutrient supplements, e.g., iron salts such as ferric phosphate, ferric pyrophosphate, ferrous gluconate and the like, riboflavin, vitamins, zinc sources such as zinch chloride, zinc sulfate and the like.

Flavorants and flavor intensifiers include organic acids, e.g., fatty saturated, unsaturated and amino acids; alcohols, e.g., primary and secondary alcohols; esters, carbonyl compounds including aldehydes and ketones, lactones; cyclic organic materials including benzene derivatives; alicyclics, heterocyclics such as furans, particularly 3-acetylfuran, alkyl pyridines, alkyl and polyalkyl pyrazines and the like, sulfur-containing materials including thiazoles, thiols, sulfides, disulfides and the like, so-called flavor potentiators such as monosodium glutamate, tetramethyl pyrazine, guanylates, inosinates, natural and synthetic flavorants such as vanilliin, ethyl-vanillin, diacetyl, phenethyl-2-furoate, maltol, natural gums and the like; spices, herbs, essential oils and extractives including "bitterness principles" such as theobromin, caffein, naringin and other suitable materials creating a bitter effect.

The specific flavoring adjuvant selected for use may be either solid or liquid, depending upon the desired physical form of the ultimate product, i.e., foodstuffs, whether simulated or natural, and should, in any event, be capable of providing an environment in which the C-10, C-11, C-12 or C-13 alkadienyl, cycloalkenyl, cycloalkylalkenyl, cycloalkylidenealkyl or cycloalkenylalkyl pyridine or pyrazine(s) can be dispersed or admixed to provide a homogeneous medium. In addition, selection of one or more flavoring adjuvants as well as the quantities thereof will depend upon the precise organoleptic character desired in the finished product; thus, in the case of flavoring compositions, ingredient selection will vary in accordance with the foodstuffs to which the flavor and aroma are to be imparted. In contra-distinction in the preparation of solid products, e.g. simultated foodstuffs, ingredients capable of providing normally solid compositions should be selected such as various cellulose derivatives.

As will be appreciated by those skilled in the art, the amount of C–10, C–11, C–12 or C–13 alkadienyl, cycloalkenyl, cycloalkylalkenyl, cycloalkylidenealkyl and cycloalkenylalkyl pyridine and/or pyrazine employed in a particular instance can vary over a relatively wide range whereby to achieve desired organoleptic effects having reference to the nature of the product. All parts and percentages given herein are by weight unless otherwise specified. Thus, correspondingly greater amounts would be necessary in those instances wherein the ultimate food composition to be flavored is relatively bland to the taste, whereas relatively minor quantities may suffice for purposes of enhancing a composition merely deficient in natural flavor or aroma. Thus, the primary requirement is that the amount selected be effective, i.e., sufficient to alter the organoleptic characteristics of the parent composition, whether foodstuff per se or flavoring composition.

Thus, the use of insufficient quantities of the C–10, C–11, C–12 or C–13 alkadienyl, cycloalkenyl, cycloalkylalkenyl, cycloalkylidenealkyl or cycloalkenylalkyl pyridine or pyrazine will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects. Thus, and with respect to ultimate food compositions, it is found that quantities of C–10, C–11, C–12 or C–13 alkadienyl, cycloalkenyl, cycloalkylalkenyl, cycloalkylidenealkyl or cycloalkenylalkyl pyridine(s) or pyrazine(s) ranging from a small but effective amount, e.g., 1.0 part per million up to about 200 parts per million by weight based on total composition are suitable. Concentrations in excess of the maximum quantities stated are not normally recommended since they fail to provide commensurate enhancement of organoleptic properties. In those instances wherein the C–10, C–11, C–12 or C–13 alkadienyl, cycloalkenyl, cycloalkylalkenyl, cycloalkylidenealkyl and/or cycloalkenylalkyl pyridine(s) or pyrazine(s) is (are) added to the foodstuff as (an) integral component(s) of a flavoring composition, it is, of course, essential that the total quantity of flavoring composition employed be sufficient to yield an effective C–10, C–11, C–12 or C–13 alkadienyl, cycloalkenyl, cycloalkylalkenyl, cycloalkylideneallyl and/or cycloalkenylalkyl pyridine or pyrazine concentration in the foodstuff product.

Favoring compositions or tobacco prepared in accordance with the present invention preferably contain the C–10, C–11, C–12 or C–13 alkadienyl, cycloalkenyl, cycloalkylalkenyl, cycloalkylidenealkyl and/or cycloalkenylalkyl pyridine or pyrazine in concentrations ranging from about 2.0 to 100% by weight, based on the total weight of said flavoring composition. The compositions described herein can be prepared according to conventional techniques well known in the art for such purposes. Thus, liquid products as typified by cake batters (e.g. yielding cinnamon-tasting cakes) can be formulated by merely admixing the involved ingredients within the proportions stated in a suitable blender to obtain the desired consistency, homogeneity of dispersion, etc. Alternatively, flavoring comopsitions in the form of the particulate solids can be conveniently prepared by admixing the C–10, C–11, C–12 or C–13 alkadienyl, cycloalkenyl, cycloalkylalkenyl, cycloalkylidenealkyl and/or cycloalkenylalkyl pyridine(s) or pyrazine(s) with, for example, gum arabic, gum tragacanth, carrageenan and the like, and thereafter, spray drying the resultant mixture whereby to obtain the particulate solid product. Pre-prepared flavor mixes in powder form, e.g., spice mix may be obtained by mixing the dried solid components, e.g., ground parsley leaves, curry powder, "korma" and the like and the C–10, C–11, C–12 or C–13 alkadienyl, cycloalkenyl, cycloalkylalkenyl, cycloalkylidenealkyl or cycloalkenylalkyl pyridine or pyrazine in a dry blender until the requisite degree of uniformity is achieved. It is presently preferred to combine with the C–10, C–11, C–12 or C–13 alkadienyl, cycloalkenyl, cycloalkylalkenyl, cycloalkylidenealkyl, or cycloalkenylalkyl pyridines or pyrazines of this invention the following flavoring adjuvants: vanillin, 1(3,4,5-trimethoxy phenyl)propene-2, cinnamic aldehyde, eugenol methyl ether, and DL-methionine.

It is well known in the tobacco art that the domestic tobaccos which are exemplified by burley, Maryland, flue-cured, bright leaf or Virginia tobaccos are low in flavor as compared with so-called oriental or aromatic tobaccos which are imported from Turkey, Greece, Bulgaria, Yugoslavia, Rhodesia, and Russia. Accordingly, it has been common practice in the tobacco industry to prepare blends of domestic and oriental tobaccos in order to provide cigarettes which have desired flavor and aroma characteristics. This invention also provides a tobacco whi has an enhanced flavor and aroma.

With reference to the aspect of this invention which concerns tobacco flavoring the C–10, C–11, C–12 and C–13 alkadienyl, cycloalkenyl, cycloalkylalkenyl, cycloalkylidenealkyl and/or cycloalkenylalkyl pyridines and/or pyrazines of this invention are added to tobacco in amounts to provide generally a tobacco in which is dispersed about 0.00005 to about 0.3 percent by weight of the additive. Preferably, the amount of additive is between about 0.0003 and about 0.02 percent by weight in order to provide tobacco having a desired flavor and aroma. The preferred percentages may be somewhat less, however, if other flavorants imparting a desired aroma are also employed. The additives may be applied in any suitable manner and preferably in the form of a liquid solution or suspension by spraying, dipping or otherwise. The additives may be incorporated at any step in the treatment of tobacco, but are preferably added after aging; curing and shredding and before the tobacco is formed into tobacco products such as cigarettes, cigars and the like. Likewise, it will be apparent that only a portion of the tobacco need be treated and the thus treated tobacco may be blended with other tobacco before the tobacco products are formed. In such cases, the tobacco treated may have the additives, in excess of the amounts above indicated so that when blended with other tobaccos the final product will have the percentage within the indicated range.

In accordance with an example of this invention, an aged, cured and shredded domestic burley tobacco is sprayed with a one percent ethyl alcohol solution of 4-(1,4,8-trimethyl-3,7-nonadienyl)pyridine in an amount to provide a tobacco composition containing 0.005 percent by weight of the said pyridine on a dry basis. Thereafter the alcohol is removed by evaporation and the tobacco is manufactured into cigarettes by the usual techniques. The cigarette when treated as indicated has a desired and pleasing aroma which is detectable in the main and side smoke streams when the cigarette is smoked; this aroma is described by some smokers as a woody cigar box-like note.

It will be particularly apparent that the manner in which the C–10, C–11, C–12 and C–13 alkadienyl-, cycloalkenyl, cycloalkylalkenyl, cycloalkylidenealkyl and/or cycloalkenylalkyl pyridines and/or pyrazines are applied to the tobacco is not particularly important since, as indicated, it may be done in the form of spraying or dipping, utilizing suitable suspensions or solutions of the additive.

Thus, water or volatile organic solvents, such as alcohol, ether, acetone, volatile hydrocarbons and the like, may be used as the carrying medium for the additive while it is being applied to the tobacco Also, other flavor and aroma producing additives, such as those disclosed in Jones U.S. Pat. No. 2,766,145 and Schumacher U.S. Pat. No. 2,978,365, may be incorporated into the tobacco with the additives of this invention.

While this invention is useful in the manufacture of cigarette tobacco, it is also suitable for use in connection with the manufacture of pipe tobacco, cigars and other tobacco products formed from sheeted tobacco dust or fines which are well known to the art. Likewise, the additives of the invention can be incorporated with materials such as filter tip materials, seam paste, packaging materials and the like which are used along with tobacco to form a product adapted for smoking Furthermore, the compounds can be added to certain tobacco substitutes of natural or synthetic origin and by the term "tobacco" as used throughout this specification is meant any composition intended for human consumption by smoking or otherwise, whether composed of tobacco plant parts or substitute materials or both.

The following examples serve to illustrate embodiments of the invention as it is now preferred to practice it. It will be understood that these examples are illustrative and the invention is to be considered restricted thereto only as indicated in the appended claims.

EXAMPLE I

Preparation of 2-(4,8-dimethyl-3,7-nonadienyl)pyridine

Into a 5-liter three-neck flask equipped with stirrer, thermometer, condenser, addition funnel, drying tube and gas bubbler are placed the following ingredients:

465 g. 2-methylpyridine (5 moles)
500 g. benzene

At room temperature, with stirring, 200 g. of sodium amide are added. The temperature of the reaction mass is allowed to rise to 80–85° C. 807 g. of myrcene hydrochloride (3.5 moles) is added to the reaction mass over a period of one hour while maintaining the temperature at 80° C. The reaction mass is then stirred for three hours at 80° C.

On cooling, 100 cc. of water is slowly added. The reaction mass is subsequently poured into one liter of water and the organic layer is separated and washed: first with a 300 cc. quantity of 5% aqueous sodium hydroxide and then with two 300 cc. volumes of water. The solvent is stripped off the organic layer and the reaction product is rushed over at 2 m. Hg pressure and 130–140° C. The reaction product is then distilled in a fractionation column at a temperature in the range of 110–113° C. and a pressure of 0.7 mm. Hg. The fractions resulting from the distillation of the 2 - (4,8-dimethyl-3,7-nonadienyl)pyridine have distinct "berry-fruit," woody-green and woody- amber notes. The following formula is confirmed by NMR, mass spectral and IR analysis:

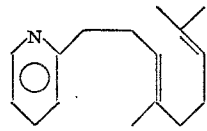

Using the foregoing procedure, when 2-methyl pyridine is replaced by 2,4-dimethyl pyridine, a mixture of 4-methyl-2-(4,8-dimethyl-3,7-nonadienyl) pyridine and 2-methyl-4-(4,8-dimethyl-3,7-nonadienyl) pyridine is synthesized.

Using the foregoing procedure, when 2-methylpyridine is replaced by 2-methylpyrazine, as a starting reactant, the compound: 2-(4,8-dimethyl-3,7-nonadienyl) pyrazine is synthesized.

EXAMPLE II

Preparation of 4-(4,8-dimethyl-3,7-nonadienyl)pyridine

Into a 22-liter reaction flask equipped with stirrer, thermometer, addition funnel, reflux condenser and gas bubbler are added the following materials:

4,185 g. 4-methyl pyridine (45 moles)
3,600 g. benzene (anhydrous)

Through an addition tube, over a period of twenty-five minutes, 1,802 g. (45.9 moles) of sodium amide are added, the temperature of the reaction mass being maintained at 24–30° C. The reaction mas is then heated slowly to reflux (pot temperature of 84° C.) and maintained at reflux until gas evolution ceases (4.5) hours). Over a period of 2.5 hours while continuing refluxing 6,291 g. of myrcene hydrochloride is added. The reaction mass is refluxed for three hours, maintaining the temperature thereof at 90–94° C. When reaction ceases, the mass is cooled and poured slowly over 9,000 g. of ice and water.

The aqueous phase is extracted with a 25-liter volume of benzene and the organic phases are combined and washed with two 3.0-liter volumes of water. The solvent is then stripped off at 100 mm. Hg pressure. The reaction product is rushed over at a vapor temperature of 52–159° C. (1–15 mm. Hg pressure). The reaction product is then fractionally distilled on a 12″ Goodloe column at a temperature in the range 123–150° C., and a pressure of 2.4 mm. Hg [reflux ratio 1:1]. The reaction product has a refractive index of $n_D^{20} = 1.5153$ and a density at 25° C. of 0.9222. Infrared, NMR and mass spectral analysis indicates that the reaction product includes a compound having the structure:

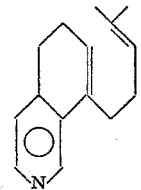

The product has a highly desirable seashore aroma reminiscent of ocean spray.

EXAMPLE III

The following composition is prepared:

| Parts by weight | Ingredient |
|---|---|
| 135 | Linalyl acetate. |
| 275 | Bergamot oil. |
| 135 | Citronellol. |
| 135 | Lavandulol. |
| 135 | Portugal oil. |
| 40.5 | Neroli oil. |
| 20.5 | Jasmin oil. |
| 20.5 | Jasmin absolute. |
| 28.0 | Neroliol, Bigarade. |
| 28.0 | Rosemary oil. |
| 13.5 | 4-(4,8-dimethyl-3,7 - nonadienyl) pyridine prepared by the process of Example II. |
| 13.5 | Rose absolute. |
| 13.5 | Hydroxy citronellol. |
| 7.0 | Cyclopentadecanolide 10%. |

The addition of the 4-(4,8-dimethyl-3,7-nonadienyl) pyridine in the quantity given adds a distinct seashore aroma to the fragrance. In the instant example, the 40.5 parts of neroli oil can be replaced by 20 parts of 2-(1,4,8-trimethyl-3,7-nonadien-1-yl)pyridine of this invention (as prepared by the process of Example VII herein) without changing the olfactory nature or quality of the fragrance.

EXAMPLE IV

The composition of Example III is incorporated in a cologne in a concentration of 2.5% in 85% ethanol; and into a handkerchief perfume in a concentration of 20% (in 95% ethanol). The compounds produced in Example II afford a distinct and definite seashore aroma, reminiscent of ocean spray to the handkerchief perfume and cologne.

EXAMPLE V

Synthesis of 5-ethyl-2-(4,8-dimethyl-nona-3,7-dienyl) pyridine (E and Z)

Into a 5-liter reaction flask equipped with stirrer, thermometer, addition funnel, reflux condenser, outlet bubbler, wet test meter and heating mantle are added the following materials: 184 grams sodium amide, and 1080 ml. anhydrous benzene.

The benzene-sodium amide mixture is heated at reflux at 81° C. Over a period of one hour, 508 grams of 5-ethyl-2-picoline is added while refluxing the mixture at a temperature of 81–91° C. Over a period of 4 hours, 1120 grams of myrcene hydrochloride is then added during which time ammonia gas is evolved. When the ammonia gas evolution ceases, one liter of a saturated sodium chloride solution and 400 ml. of water is added to the reaction mass. The aqueous layer is then separated and the organic layer is first rushed over and then subjected to distillation over a temperature range of 155–160° C. (pressure: 2.5 mm. Hg). The yield of purified material resulting from subsequent distillation [143–149° C. (1.4–1.5 mm. Hg)] on a Goodloe column is 460 grams. On the basis of NMR analysis the product is a mixture of cis (E) and trans (Z) isomers having the following structures:

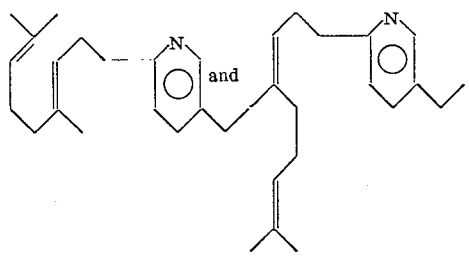

The mixture has a green, fresh potato aroma. At concentrations of 50 p.p.m. in water the product exhibits a coriander-oil-like aroma.

EXAMPLE VI

Process for the preparation of 4-1(1,4,8-trimethyl-(E)-3,7-nonadien-1-yl pyridine and 4-(1,4,8-trimethyl-(Z)-3,7-nonadien-1-yl pyridine Into a 2-liter reaction flask equipped with stirrer, thermometer, dropping funnel, condenser, outlet buttler, wet test meter and heating mantle are added the following ingredients: 90 grams sodium amide, and 380 ml. anhydrous benzene.

The mixture is heated to reflux (80° C.) and to the refluxing mixture 240 grams of 4-ethyl pyridine are added over a period of eight hours. Over a period of six hours while refluxing, 360 grams of myrcene hydrochloride is then added. During this period of time ammonia gas is evolved. At the cessation of evolution of ammonia gas, the reaction mixture is washed with one liter of saturated sodium chloride solution and 500 ml. of water. The reaction mass is then separated into a aqueous phase (which is discarded) and an organic phase which is distilled at a vapor temperature in the range of 128–139° C. (pressure: 1.0–1.5 mm. Hg). The yield of the material thus recovered is 218 grams. The resulting material has a chemical structure confirmed by NMR as follows:

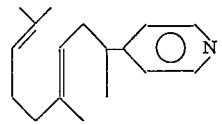

The material has a strong persistent amber-woody note.

EXAMPLE VII

Preparation of 2-(1,4,8-trimethyl-(E)-3,7-nonadien-1-yl) pyridine and 2-(1,4,8-trimethyl (Z)-3,7-nonadien-1-yl) pyridine Into a 2-liter reaction flask equipped with stirrer, thermometer, dropping funnel, condenser, outlet bubbler, wet test meter and heating mantle are added the following ingredients: 80 grams sodium amide, and 380 ml. anhydrous benzene.

The mixture is heated to reflux (80° C.) and to the refluxing mixture is added 240 grams of 2-ethyl pyridine over a period of eight hours. Then, over a period of six hours during refluxing, 360 grams of myrcene hydrochloride are added. During this period of time, ammonia gas is evolved. At the cessation of evolution of ammonia gas, the reaction mixture is washed with one liter of saturated sodium chloride solution and 500 ml. of water. The reaction mass is then separated into an aqueous phase (which is discarded) and an organic phase which is distilled at a vapor temperature in the range of 124–127° C. (pressure: 1.7–1.8 mm. Hg). The yield of the material thus recovered is 218 grams. The resulting material has a chemical structure confirmed by NMR as follows:

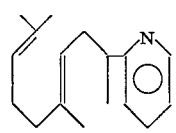

The product has spice-like and woody flavor notes and a green and twiggy aroma.

EXAMPLE VIII

The following composition is prepared (parts by weight):

| Ingredient: | Parts |
| --- | --- |
| Bergamot oil | 120 |
| Methyl ionone | 60 |
| Jasmin extra | 80 |
| Petitgrain | 60 |
| Patchouli oil | 60 |
| Violet perfume base | 60 |
| 5-ethyl-2-(4,8-dimethylnona - 3,7 - dienyl)pyridine (E and Z) | 20 |
| Lemon oil | 80 |
| Rose Geranium oil | 120 |
| Lavender oil, French | 120 |
| Sweet Orange Oil | 80 |
| Musk extract, 3% | 50 |
| Civet extract, 3% | 50 |
| | 960 |

The addition of 5-ethyl-2-(4,8-dimethyl-nona-3,7-dienyl)pyridine (E and Z) improves the overall quality of the instant formulation, lending a more neroli oil-like and a coriander-like effect thereto.

EXAMPLE IX

The composition of Example VIII is incorporated into a cologne in a concentration of 2.5% in 85% ethanol and into a handkerchief perfume in a concentration of 20% (in 95% ethanol). The product of Example V affords a distinct and definite neroli oil-like and coriander like quantity to the handkerchief perfume and cologne.

EXAMPLE X

The following mixture is prepared:

| Ingredient: | Parts |
| --- | --- |
| Glycine | 1.38 |
| Dextrose | 11.08 |
| DL-methionine | 0.46 |
| Pyruvic acid | 0.12 |
| Lactose | 4.61 |
| Levulose | 0.92 |
| Protein hydrolysate | 1.84 |
| Dairy whey | 5.54 |
| Potato starch | 2.77 |
| Water | 60.00 |
| Ethyl alcohol (95%) | 10.28 |

The mixture is refluxed for four hours, cooled and then 10.28 parts of 95% alcohol are added. The reaction product is aged for three days and then 1.14 parts of 5-ethyl-2-(4,8-dimethyl-nona-3,7-dienyl)pyridine (E and Z) as prepared in Example V are added. The resulting product is an excellent potato flavor with an intense "green" note.

The resulting product can be further processed to a dry powder by admixing 100 parts with 28 parts of gum arabic. The mixture is emulsified and spray-dried to produce a dry powder which is suitable for use as a potato flavor on dried materials or which can be redissolved in water or other vehicles for deposition from a solution, suspension or emulsion.

Another excellent potato flavor is prepared, having a still more intense green note when the material of Example V is replaced by the material of Example VII.

EXAMPLE XI

A perfume composition is prepared with the following ingredients:

| Ingredients: | Parts |
| --- | --- |
| Vetivert oil | 40 |
| Mixture of Example VI | 60 |
| Sandalwood oil | 100 |
| Rose geranium oil | 200 |
| Musk extract (3%) | 25 |
| Civet extract (3%) | 25 |
| Benzyl-iso-eugenol | 100 |
| Coumarin | 100 |
| Heliotropin | 50 |
| Bois de rose oil | 200 |
| Benzoin resin | 100 |
| | 1000 |

A perfume composition exhibits an excellent woody fragrance. When the alkadienyl pyridine of Example VI is omitted, the composition lacks the woody, amber fullness of the complete perfume composition of this example.

It will be understood from the present description that the 1,5,8- and 1,6,8-trimethyl homologues of the materials prepared in Example VI of the present invention can be used separately or in combination with each other to provide a good intense amber, woody fragrance note.

EXAMPLE XII

Preparation of soap composition

One hundred grams of soap chips are mixed with one gram of the perfume composition of Example XI until a substantially homogeneous composition is obtained. The perfumed soap composition manifests an excellent woody, amber, odor character.

EXAMPLE XII

Preparation of a detergent composition

A total of 100 grams of a detergent powder is mixed with 0.15 gram of the perfume composition of Example XI until a substantially homogenous composition is obtained. This composition has an excellent woody-amber odor.

EXAMPLE XIV

Preparation of a cosmetic powder composition

A cosmetic powder is prepared by mixing in a ball mill 100 grams of talcum powder with 0.25 gram of the mixture obtained from the process of Example VI. A second cosmetic powder is similarly prepared except that the material of Example I is used. The cosmetic powders prepared using the Example VI mixture and the Example I material have excellent woody-amber aromas.

EXAMPLE XV

Perfumed liquid detergent

Concentrated liquid detergents with a woody-amber odor are prepared containing 0.0%, 0.15% and 0.20% of the mixture of Example VI of this invention. They are prepared by adding and homogeneously mixing the appropriate quantity of the compound in the liquid detergent. Each of the detergents possesses a woody-amber fragrance, the intensity increasing with greater concentration of the alkadienyl pyridine of this invention.

EXAMPLE XVI

Into a 2-liter flask equipped with stirrer, thermometer, condenser, dropping funnel, heating mantle, outlet bubbler and wet test meter the following ingredients are added:

| | |
| --- | --- |
| Sodium amide | g. 150 |
| Alpha-picoline | g. 348 |
| Anhydrous benzene | mls. 375 |

The foregoing mixture is heated to reflux and over a period of one hour, 600 grams of myrtenyl chloride is added causing the evolution of 76 liters of ammonia gas. At the termination of the reaction the reaction mass is washed with two 500 ml. volumes of a 10% sodium chloride solution, the aqueous layer is separated from the organic layer and discarded. The organic layer is rushed over under vacuum and then distilled at a temperature in the range of 125–126° C. [1.7–1.8 mm. Hg.] in a one-foot Goodloe distillation column operating at a reflux ratio of 9:1. The resulting product as determined by NMR analysis is 2-(2-pinen-10-yl-methyl)pyridine having the structure:

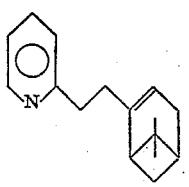

The material has a fresh green verdural type odor with animal, amber and "seashore aroma"-like qualities.

EXAMPLE XVII

Preparation of a perfume composition containing 2-(2-pinen-10-yl-methyl) pyridine The following composition is prepared:

| Parts by weight: | Ingredient |
|---|---|
| 135 | Linalyl acetate. |
| 275 | Bergamot oil. |
| 135 | Citronellol. |
| 135 | Lavandulol. |
| 135 | Portugal oil. |
| 40.5 | Neroli oil. |
| 20.5 | Jasmin oil. |
| 20.5 | Jasmin absolute. |
| 28.0 | Neroliol, Bigarade. |
| 28.0 | Rosemary oil. |
| 23.5 | 2 - ( 2 - Pine-10-yl-methyl) pyridine prepared by the process of Example XVI. |
| 13.5 | Rose absolute. |
| 13.5 | Hydroxy citronellol. |
| 7.0 | Cyclopentadecanolide 10%. |

The addition of the 2-(2-pinen-10-yl-methyl) pyridine in the quantity given adds an excellent distinctive ambery seashore aroma to the faagrance.

EXAMPLE XVIII

Preparation of 4-(2-pinen-10-yl-methyl) pyridine

Into a two-liter flask equipped with stirrer, thermometer, condenser, dropping funnel, heating mantle, outlet bubbler and wet test meter the following ingredients are added:

| | | |
|---|---|---|
| Sodium hydride (57% in mineral oil) | g | 100 |
| Toluene, anhydrous | mls | 540 |
| Gamma-picoline | g | 205 |

The mixture is heatd to reflux (117° C.) and maintained at reflux until gas evolution ceases (thus forming a "picoline salt product"). Into a 3-liter flask equipped with stirrer, thermometer, condenser, dropping funnel, ice bath, outlet bubbler and wet test meter 500 gm. of myrtenyl chloride is added. While maintaining the temperature of the reaction mixture at 24–27° C. (with the use of an ice bath) the contents produced as described above, in the 2-liter flask (comprising the "picoline salt product") are added over a period of four hours. The reaction mixture is then admixed with one liter of a saturated sodium chloride solution followed by admixture with 250 ml. of water. The aqueous phase is separated and discarded and the organic phase is rushed over and then distilled at a temperature range of 128–130° C. (1.2–1.3 mm. Hg] in a 6″ Goodloe distillation column, operating at a reflux ratio of 1:1. The reaction product as determined by NMR analysis is 4-(2-pinen-10-yl-methyl)pyridine having the structure:

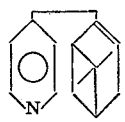

This material has a woody odor with "seashore" and citrus notes.

EXAMPLE XIX

Preparation of perfume composition containing 4-(2-pinen-10-yl-methyl)pyridine

The following composition is prepared:

| Parts by weight: | Ingredient |
|---|---|
| 135 | Linalyl acetate. |
| 275 | Bergamot oil. |
| 135 | Citronellol. |
| 135 | Lavandulol. |
| 135 | Portugal oil. |
| 40.5 | Neroli oil. |
| 20.5 | Jasmin oil. |
| 20.5 | Jasmin absolute. |
| 28.0 | Neroliol, Bigarade. |
| 28.0 | Rosemary oil. |
| 23.5 | 4-(2 - pinen-10-yl-methyl)pyridine pre-prepared by the process of Example XVIII. |
| 13.5 | Rose absolute. |
| 13.5 | Hydroxy citronellol. |
| 7.0 | Cyclopentadecanolide 10%. |

The addition of the 4-(2-pinen-10-yl-methyl)pyridine in the quantity given adds an excellent, distinctive, woody, citrusy "seashore" aroma to the fragrance.

In the instant example, the 40.5 parts of neroli oil can be replaced by 20 parts of 2-(1,4,8-trimethyl-3,7-nonadien-1-yl)pyridine of this invention (as prepared by the process of Example VII herein) without changing the olfactory nature or quality of the fragrance.

EXAMPLE XX

The following mixture is prepared:

| Ingredient: | Parts by weight |
|---|---|
| Diacetyl (10% in ethanol) | 2 |
| 2,3-diethyl pyrazine (1% in ethanol) | 4 |
| Furfural | 6 |
| Methional (10% in ethanol) | 4 |
| Phenyl acetaldehyde (10% in ethanol) | 2 |
| 5 - ethyl - 2 - (4,8 - dimethyl - 3,7 - nonadienyl) pyridine as prepared in Example V. [10% in ethanol] | 4 |
| Maltol | 1 |
| Tetramethyl pyrazine (1% in ethanol) | 2 |
| 95% ethanol | 15 |
| Propylene glycol | 60 |

The C–11 alkadienyl pyridine prepared by the process of Example V adds to the formulation an excellent raw fresh potato character.

EXAMPLE XXI

One mole of α-pyridyl magnesium chloride-tetrahydrofuran complex (prepared by the process of Example 17 at column 16 of U.S. Pat. 2,855,397) dissolved in tetrahydrofuran (total volume: 442 ml.) is added slowly from a dropping funnel to a stirred mass of 1 mole of 6,6-dimethyl-norpinane-2-acetaldehyde (prepared by the process described at columns 5 and 6 of U.S. Pat. 2,427,345) in a one liter flask equipped with thermometer, nitrogen bubbler, heating mantle and reflux condenser. Air is displaced from the apparatus by nitrogen, a slow flow of this gas being maintained during the reaction. The temperature of the reaction mixture is maintained at about 40° C. by varying rate of addition of the α-pyridyl Grignard reagent and by occasional use of a cooling water bath and heating mantle, alternately. The reagent is added over a thirty minute period, the stirring of the reaction mass being continued for an additional 2.5 hours. Then, dilute sulfuric acid (28 ml. in 100 ml. water) is slowly added. GLC, mass spectral, infra-red and NMR analysis yield the information that the product thus formed has the structure:

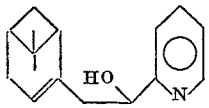

subsequent to fractional distillation.

The resulting product is then rushed over and fractionally redistilled. To 0.25 mole of the resulting alcohol, 1 mole of sulfuric acid is added, very slowly with vigorous stirring and cooling using a salt-ice water bath. The temperature is kept below 60° C. The solution is then poured onto cracked ice and basicified with an aqueous solution of sodium hydroxide. The oily organic layer is separated and washed with diethyl ether. The ether is then evaporated, and the resulting material is distilled yielding a product having the structure:

as confirmed by NMR and Infra-red analysis.

0.1 mole of the resulting product, dissolved in glacial acetic acid is hydrogenated in a low pressure hydrogenator with 100 mg. of Adams catalyst for 1.5 hours. Pressure drop vs. time charting shows when the hydrogenation is complete. Fractional distillation of the resulting material at 125–127° C. (1.7–1.8 mm. Hg) yields a reaction product having the structure:

confirmed by NMR and infra-red and Raman spectral analysis.

EXAMPLE XXII

Into a one-liter round-bottom flask equipped with reflux condenser, stirrer, gas-inlet tube and dropping funnel are placed the following ingredients:

Lithium _____gm__ 7.4
Diethyl ether _____cc__ 300
50% bromobenzene-diethyl ether solution ____cc__ 20

A mixture of 61 cc. of 2,4-dimethyl-pyridine and 60 cc. of diethyl ether is added, with stirring over a period of one hour. The flask is then cooled in an ice-NaCl bath, and a solution of 60 gm. of myrtenal in 60 cc. of diethyl ether is added over a period of two hours. The reaction mass is then poured onto ice and extracted with two volumes of diethyl ether. The resulting ether layer is then extracted with an excess of ice-cold 1 N HCl. Then, an excess of ice-cold 2 N NaOH solution is added to the acidic solution and the liberated alcohol is dissolved in ether. After washing with water, drying with sodium sulfate and removal of the ether by distillation, the residue is distilled in high vacuum yielding a product (confirmed by NMR and IR analysis) having the structure:

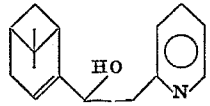

The resulting product is dehydrated and hydrogenated according to the procedure set forth in Example XXI, thus yielding a compound having the structure:

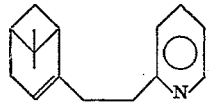

as confirmed by NMR, infrared and mass-spectral analysis.

It will be appreciated from the present description that the novel heterocyclic nitrogen compounds can be included in other flavoring or perfume compositions and in other foodstuffs, tobacco compositions or perfumed articles.

What is claimed is:

1. A nitrogen heterocyclic compound having the structure:

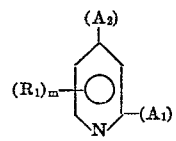

wherein $R_1$ represents $C_1$–$C_3$ lower alkyl and $m$ is an integer ranging from zero up to 2; wherein one of $A_1$ or $A_2$ is a moiety selected from the group consisting of cyclododecen-3-yl-methyl,
2-pinen-10-yl-methyl,
4,8-dimethyl-3,7-nonadienyl,
3-methyl-6-i-propyl-2-cyclohexenyl-methyl, and
1,4,8-trimethyl-3,7-nonadien-1-yl, and the other of $A_1$ or $A_2$ is $R_1$ or hydrogen.
2. 4-(2-pinen-10-yl-methyl) pyridine.
3. 2-(2-pinen-10-yl-methyl) pyridine.
4. A (4,8-dimethyl-3,7-nonadienyl) pyridine.
5. 2(4,8-dimethyl-3,7-nonadienyl)pyridine.
6. 4(4,8-dimethyl-3,7-nonadienyl) pyridine.
7. 2-ethyl-5-(4,8-dimethyl-3,7-nonadienyl) pyridine.
8. 2(1,4,8-trimethyl-3,7-nonadienyl) pyridine.
9. 4(1,4,8-trimethyl-3,7-nonadienyl) pyridine.

References Cited

Karrer: Organic Chemistry, 4th English edition, p. 928, Elsevier Pub. Co. (N.Y.) 1950.

ALAN L. ROTMAN, Primary Examiner

U.S. Cl. X.R.

260—240 D, 240 R, 250 R, 297 R, 297 B; 99—140 R; 424—250, 263